United States Patent [19]
Ryan

[11] 3,841,399
[45] Oct. 15, 1974

[54] SECONDARY OIL RECOVERY

[75] Inventor: Roger C. Ryan, Chicago, Ill.

[73] Assignee: Nalco Chemical Company, Chicago, Ill.

[22] Filed: Jan. 29, 1973

[21] Appl. No.: 327,724

[52] U.S. Cl............ 166/300, 166/270, 166/275
[51] Int. Cl............................................ E21b 43/27
[58] Field of Search .......... 166/270, 274, 275, 300, 166/305 R; 252/8.55 D

[56] References Cited
UNITED STATES PATENTS

| | | | |
|---|---|---|---|
| 2,827,964 | 3/1958 | Sandiford et al. | 166/274 |
| 2,959,574 | 11/1960 | Woodberry | 252/8.55 D |
| 3,370,649 | 2/1968 | Wolgemuth | 166/274 |
| 3,502,146 | 3/1970 | Huro | 166/270 |
| 3,603,397 | 9/1971 | Peray | 166/270 |
| 3,610,339 | 10/1971 | Harvey | 166/275 |
| 3,684,014 | 8/1972 | Norton et al. | 252/8.55 D |
| 3,709,297 | 1/1973 | Nute et al. | 166/274 |
| 3,794,115 | 2/1974 | Skagerberg | 166/294 |

Primary Examiner—Stephen J. Novosad
Assistant Examiner—Jack E. Ebel
Attorney, Agent, or Firm—Kinzer, Plyer, Dorn & McEachran

[57] ABSTRACT

Recovery of oil from a well is improved by producing down-hole hydrolysis of a synthetic emulsion copolymer.

2 Claims, No Drawings

SECONDARY OIL RECOVERY

The technique of introducing water into a subterranean deposit of petroleum to increase yield at the productive well has been practiced for a long time. One process known as water flooding consists of introducing water at an injection or in-put well and forcing it through the porous subterranean oil-bearing formation in the direction of the producing out-put well. The water displaces oil from those areas where normal primary action at the producing well is ineffective to obtain recovery. Thus, as the water flows through the oil-bearing formation, oil is forced to the producing well along an advancing front, petroleum being lighter than water.

It has been proposed that the desired displacement action in water flooding be enhanced by adding a viscosity-increasing agent to the water, such as an acrylamide polmer. The explanation is that the agent encourages the water medium to confine itself to a planar front, rather than inefficiently dispersing into the surrounding porous earth formation. In practice, a water solution of the agent for increasing viscosity is first injected into the oil-bearing formation; afterwards, the flooding water is injected.

Another process for increasing oil recovery is known as water shut-off, intended to diminish the amount of subterranean water invariably emerging from the producing well as an impurity or diluent. Thus, a viscous, polymeric material is introduced directly into the bore of the producing well, under pressure. The effect, as noted, is a decrease in the amount of subterranean water emerging at the producing well, and therefore the net result is an increased yield of petroleum. It is reasoned that the polymer somehow selectively plugs the pores of the formation so that water is constrained while petroleum is produced.

These processes are disclosed in U.S. Pat. Nos. 3,308,885 and 3,490,533 representing the best prior art of which I am aware. The earlier patent is principally concerned with the water shut-off method applied at the producing well; the polymer is a partially (8 to 70 per cent) hydrolyzed water soluble polyacrylamide.

Under the second patent water soluble constituents (monomers) for forming a polymer are introduced either at the production well, or alternatively at one of the injection wells used for water flooding, along with a catalyst intended to promote the formation of the viscous polymer within the subterranean structure.

There are several objections to pumping a polymer into a porous earth formation for the purpose of enhancing oil recovery. For one thing, the sharp edge restrictions represented by the subterranean pore boundaries can apply shear forces to the polymer, fracturing the polymer and thereby defeating the intended purpose. Secondly, the polymer tends to plug the first formation it encounters, presenting resistance to further penetration by the polymer flow which follows. Third, pumping costs increase exponentially with viscosity. For these reasons there is merit in the proposal in U.S. Pat. No. 3,490,533, that of introducing the reactants in water solution rather than the final polymer product, and allowing the polymer to form in situ. However, a subterranean cavity is not the most ideal vessel for conducting a polymerization reaction, especially one involving use of a catalyst having latent activity. Assuredly, it is difficult to control the molecular size of the polymer. In short, under U.S. Pat. No. 3,490,533 the catalyzed polymer formation within the earth structure is difficult to administer, and the primary object of the present invention is to develop and introduce into the oil-bearing formation a system comprised of (1) a potentially hydrolyzable synthetic aqueous emulsion polymer, commonly known as a latex, of low viscosity (hence easy to pump) inherently able to penetrate the formation and (2) caustic or sodium hydroxide at a concentration and temperature in water which will induce eventual hydrolysis of the polymer within the porous earth structure.

Under the present invention, down-hole hydrolysis can be both delayed and regulated merely by varying the concentration of caustic in consideration of down-hole temperature conditions. Consequently, as already stated, the water emulsion or unhydrolyzed product of low viscosity is easily pumped and just as easily forced into the earth formation, compared to introducing an already reacted polymer. The synthetic emulsion polymer is a water dispersion of acrylonitrile copolymerized with ethylacrylate as the preferred hydrolyzable comonomer, under and in accordance with the following example.

EXAMPLE

| Ingredient | | Parts by Weight |
|---|---|---|
| Deionized water | | 200.0 |
| Emulsifier | | 28.8 |
| Acrylonitrile (monomer) | | 114.5 |
| Ethylacrylate (monomer) | | 29.5 |
| Potassium persulfate | ) | 0.072 in $5H_2O$ |
| | ) Redox catalyst | |
| Sodium Metabisulfite | ) | 0.072 in $5H_2O$ |
| $H_2SO_4$ | | to pH 2.8 |

The preparation is not part of the present invention, being a standard, known procedure for obtaining a synthetic aqueous emulsion copolymer of acrylonitrile and ethyl acrylate. The monomers are first mixed and added continuously at a slow rate to a reaction vessel, suitable for emulsion copolymerization, containing the other ingredients at 45°–50°C. (The reaction vessel is initially flushed with nitrogen, and nitrogen is allowed to flow continuously over the reaction surface). After addition of the monomers, the reaction is completed in about two hours, resulting in the desired emulsion copolymer having a solids content of 41.0 percent and a viscosity of 30 cps.

The ratio of acrylonitrile to ethyl acrylate in the copolymer of the example is about 80:20, resulting in excellent emulsion stability and a product which will hydrolyze to a 70:30 ratio of sodium acrylate and acrylamide. The ratio of 80:20 in the copolymer may be varied with a resultant change in the ratio of the hydrolyzed product.

The molecular weight of the unhydrolyzed copolymer may be varied, as is well known, by changing the amount of emulsifier (directly proportional) or the catalyst (inversely proportional). Thus, the molecular weight may be decreased to 5,000,000. Molecular weight may be decreased by using a chain transfer agent such as dodecane thiol, and minimal blanketing with the inert gas, $N_2$. Sulfuric acid is present in a small amount to inhibit hydrolysis.

The particle size of the emulsion polymer under the example is in the range of $0.2\mu$ to $1\mu$; the size may be smaller or greater depending upon the reaction conditions selected. In any event, the copolymer is of small particle size and low viscosity, compared to the hydrolyzed product, and hence may be easily pumped downhole, either at the producing well or injection well depending upon whether the technique for enhancing oil recovery is the water shut-off mode or the water flooding mode; the emulsion polymer readily penetrates the oil-bearing formation because of the small particle sizes, water dispersed.

The characteristic feature of the present invention is to produce down-hole hydrolysis of the copolymer, induced by addition of caustic, $N_aOH$. Hydrolysis is dependent on temperature and concentration of caustic. Taking 100 parts by weight of the product of the above example at 90°C, and adding 28.5 parts by weight of flake NaOH, hydrolysis is completed in about three hours. The hydrolyzed copolymer, ethylacrylate/acrylonitrile derived under the example, has a molecular weight of about 4.6 million, an intrinsic viscosity of 7.2, and a 1% Brookfield viscosity of over 1000 cps, manifesting the structural change from a low viscosity, easily pumped, highly penetrating precursor to a high viscosity, sluggish hydrolysis product formed in situ at the subterranean oil-bearing sites. Thus, the emulsion copolymer as it hydrolyzes first passes through a swollen stage which breaks down as the polymer achieves solubility during continued hydrolysis.

The concentration of caustic, the down-hole temperature and the time of addition will depend upon the oil field circumstance. Thus, if the subterranean path to be traversed is short, as where the area around the bore of the producing well is simply to be "plugged", then the unhydrolyzed precursor and caustic may be mixed at the well site and introduced together, hydrolysis occurring within two or three hours again depending on the amount of caustic employed and the temperature of the formation. On the other hand, if the path is long and not easily penetrated, then the preference is to first introduce the emulsion copolymer, and after traverse has been achieved the caustic may be pumped into the formation which bears the yet unhydrolyzed copolymer. The most productive approach will naturally be selected, possibly based on trial and error experience, and of course the degree of hydrolysis is directly proportional to the concentration of caustic and the temperature.

The reactions are simple. The emulsion polymer is a chain of acrylonitrile and ethyl acrylate, repeating units

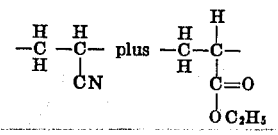

and producing

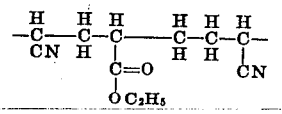

which in the presence of NaOH hydrolyzes to

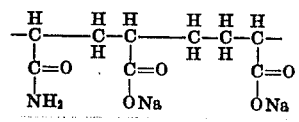

with $NH_3$ and $C_2H_5OH$ as by-products.

The comonomer ethyl acrylate is chosen as a hydrolyzable comonomer because it enables a high solids content to be realized in the emulsion copolymer, meaning a high yield of the hydrolyzed copolymer. Consequently, ethyl acrylate is representative of a class of hydrolyzable monomer to be copolymerized with acrylonitrile.

Under most circumstances, the emulsion copolymer as manufactured, and the caustic as well, will be diluted with water at the field location. The selected delay in down-hole hydrolysis may be hours, days or even weeks.

I claim:

1. In a method of recovery of petroleum at an oil well, the improvement comprising: pumping concurrently into a producing well or an injection well an aqueous synthetic emulsion copolymer consisting of acrylonitrile and ethyl acrylate, and caustic which produces down-hole hydrolysis of the emulsion copolymer.

2. A method according to claim 1 in which down-hole hydrolysis is delayed by selecting and imposing a concentration of caustic in terms of down-hole temperature.

* * * * *

PO-1050
(5/69)

UNITED STATES PATENT OFFICE
CERTIFICATE OF CORRECTION

Patent No. 3,841,399      Dated Oct. 15, 1974

Inventor(s) ROGER C. RYAN

It is certified that error appears in the above-identified patent and that said Letters Patent are hereby corrected as shown below:

In the specification, column 2, the sentence beginning in line 61 should read:

-- Thus, the molecular weight may be varied from 190,000 to 5,000,000. --

Signed and sealed this 31st day of December 1974.

(SEAL)
Attest:

McCOY M. GIBSON JR.
Attesting Officer

C. MARSHALL DANN
Commissioner of Patents